United States Patent
King et al.

(10) Patent No.: US 8,510,714 B2
(45) Date of Patent: Aug. 13, 2013

(54) IMPLEMENTING INTEGRATED DOCUMENTATION AND APPLICATION TESTING

(75) Inventors: Amber Rebecca Field King, Rochester, MN (US); John Peter Merges, III, Rochester, MN (US); Diane Elaine Olson, Rochester, MN (US); Alwood Patrick Williams, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 12/424,653

(22) Filed: Apr. 16, 2009

(65) Prior Publication Data

US 2010/0269100 A1    Oct. 21, 2010

(51) Int. Cl.
G06F 9/44    (2006.01)

(52) U.S. Cl.
USPC ........... 717/124; 717/123; 717/126; 702/119; 702/123; 712/227

(58) Field of Classification Search
USPC .......... 717/123–135; 702/119, 123; 712/227
See application file for complete search history.

(56) References Cited

U.S. PATENT DOCUMENTS

| | | | | |
|---|---|---|---|---|
| 5,452,206 A * | 9/1995 | Turrietta et al. | ............... | 715/236 |
| 5,987,251 A * | 11/1999 | Crockett et al. | ............... | 717/115 |
| 6,378,088 B1 * | 4/2002 | Mongan | ............... | 714/39 |
| 6,381,604 B1 * | 4/2002 | Caughran et al. | ..................... | 1/1 |
| 6,961,873 B2 | 11/2005 | Dubovsky | | |
| 7,568,184 B1 * | 7/2009 | Roth | ............... | 717/123 |
| 2002/0184485 A1 * | 12/2002 | Dray et al. | .................... | 713/150 |
| 2005/0081189 A1 * | 4/2005 | Krasikov et al. | ............ | 717/123 |
| 2005/0172269 A1 * | 8/2005 | Johnson et al. | ............... | 717/124 |
| 2008/0086627 A1 * | 4/2008 | Splaine et al. | ................ | 712/227 |

OTHER PUBLICATIONS

Salvatore Mamone, Documentation Testing, Mar. 2000, ACM SIGSOFT, vol. 25 No. 2, pp. 26-30.*
http://junit.sourceforge.net/doc/cookstour/cookstour.htm.
http://www.kimbly.com/blog/000368.html.
http://www.beansoftware.com/ASP.NET-Tutorials/Automatic-Documentation-VB.aspx.
http://java.sun.com/j2se/javadoc/.
http://www.stc.org/ConfrProceed/2003/PDFs/STC50-106.pdf.
http://www-306.ibm.com/software/awdtools/tester/functional/.

* cited by examiner

*Primary Examiner* — Chat Do
*Assistant Examiner* — Sergio J Curbelo, III
(74) *Attorney, Agent, or Firm* — Joan Pennington (57) ABSTRACT

A method, apparatus, and computer program product to implement integrated documentation and functional application testing are provided. An integrated test engine drives both functional application testing and documentation testing for the application. The integrated test engine uses documentation instructions, which are embedded with metadata and represent how to automate each step in the documentation and the expected results, and runs a series of tests that ensure that the application works as expected and that the documentation accurately reflects how the application works.

18 Claims, 6 Drawing Sheets

IMPLEMENTING INTEGRATED DOCUMENTATION AND APPLICATION TESTING

FIELD OF THE INVENTION

The present invention relates generally to the data processing field, and more particularly, relates to a method, apparatus and computer program product for implementing integrated documentation and functional application testing.

DESCRIPTION OF THE RELATED ART

Achieving correct documentation for a product is extremely important for cost savings. Benefits of effective documentation include lower onboard expenses, with new programmers and testers using a product to learn the product, and lower customer service costs since customers need less training and service calls are greatly diminished.

Testing the documentation is a key step in the software development lifecycle, but often companies do not have adequate time or the money to perfect their documentation before it is delivered to clients.

Currently most documentation testing is performed by one or more developers, testers, technical writers, and the like, manually checking the document. This is labor-intensive requiring significant time to complete and is error-prone as most documentation testers are not knowledgeable about every component of the application.

One known self-test documentation arrangement for HyperText Markup Language (HTML) and XML-based specification HTML (XHTML) documents provides an expected outcome in the program code. A disconnect exists however between what the program actually does and what is reflected in the documentation. When an application change is made, and the documentation is not updated, the documentation is no longer correct. Also, this self-test documentation arrangement only works for HTML and XHTML documents.

Available testing arrangements fail to test documentation to ensure that the comments match exactly with what the application is suppose to do. Available testing arrangements also rely upon developers for fully documenting their code and doing so in a way that would make sense to other users, which typically may not happen.

A need exists for an effective mechanism to automatically test documentation and an application at the same time, and to ensure that the documentation accurately reflects what the application can do.

SUMMARY OF THE INVENTION

Principal aspects of the present invention are to provide a method, apparatus and computer program product for implementing integrated documentation and functional application testing. Other important aspects of the present invention are to provide such method, apparatus and computer program product for implementing integrated documentation and functional application testing substantially without negative effect and that overcome many of the disadvantages of prior art arrangements.

In brief, a method, apparatus, and computer program product are provided for implementing integrated documentation and functional application testing. An integrated test engine is applied to drive both functional application testing and documentation testing for the application. The integrated test engine uses documentation instructions, which are embedded with metadata and represent how to automate each step in the documentation and the expected results, and runs a series of tests defined by the list of automated test instructions to functionally test both the application and the documentation.

In accordance with features of the invention, the documentation, application, and the consistency between the two all are tested at the same time. Automating testing of the invention replaces the conventional manual documentation testing process, saving significant amount of testers' time.

In accordance with features of the invention, application users are provided a high-quality, up-to-date product, with automated documentation testing performed, for example, every time individual program fixes are made.

In accordance with features of the invention, the documentation advantageously is tested at different levels and in different environments, such as end-user, developer documentation, and administration documentation, to ensure each group of consumers has a quality product. If a customer permits testing on their machine, tests advantageously are run in a variety of different customer environments, allowing the product to officially support more environments, without costing the application developer more money in testing.

In accordance with features of the invention, when a problem is found, a notice can be advantageously sent to the developer and a cautionary statement is placed in the document, allowing documentation fixes to be made quickly and ensuring the accuracy of each document.

In accordance with features of the invention, integrating the documentation testing with product functional testing, streamlines all test phases and test consistency is enabled between the documentation and the application.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method is provided for integrated documentation and functional application testing. An integrated test engine of the invention drives both functional application testing and documentation testing for the application. The documentation, the application, and the consistency between the two all are tested at the same time. The integrated test engine uses documentation instructions, which are embedded with metadata and represent how to automate each step in the documentation and the expected results, to run through a series of tests that ensure that the application works as expected and that the documentation accurately reflects how the application works.

Figure 1:
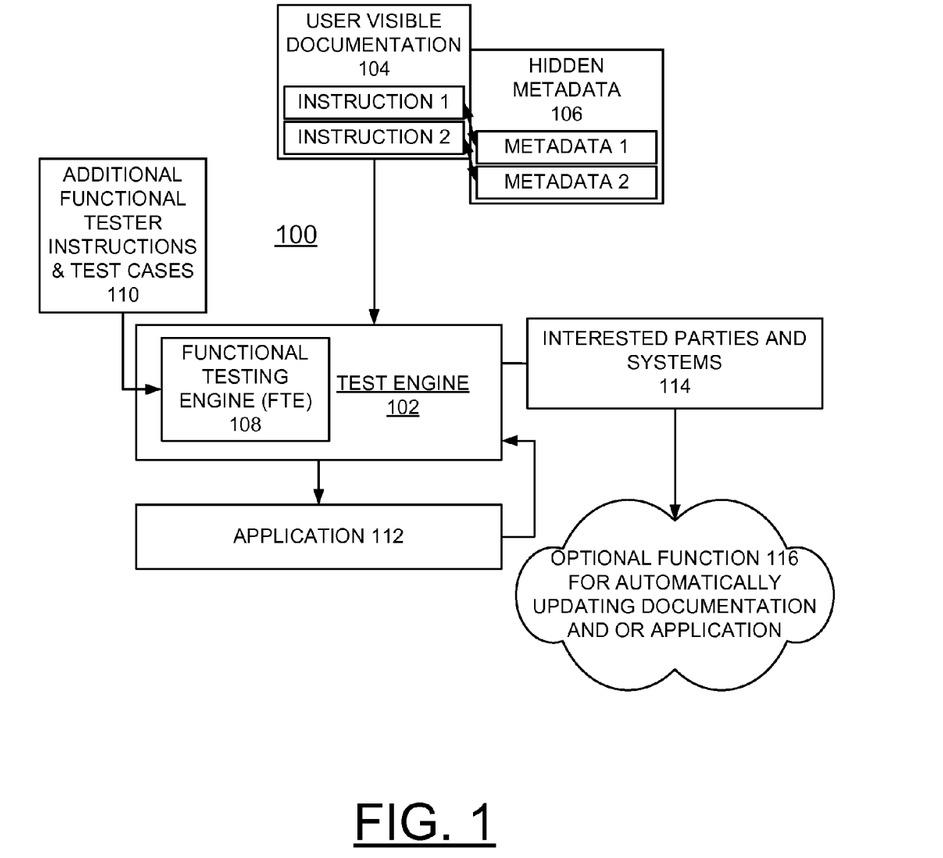
FIG. 1 is logical block diagram representation illustrating an exemplary test system for implementing integrated documentation and functional application testing in accordance with the preferred embodiment.

Having reference now to the drawings, in FIG. 1, there is shown an exemplary test system generally designated by the reference character 100 for implementing integrated documentation and functional application testing in accordance with the preferred embodiment.

Test system 100 includes a test engine 102, user visible documentation 104, and hidden metadata 106 in accordance with the preferred embodiment. Each of the instructions 1, 2 in the documentation 104 is associated with some metadata of the preferred embodiment, such as one or more of the respective metadata 1, 2, of the hidden metadata 106, as shown.

In accordance with features of the invention, the test engine 102 correlates documentation instructions 104, which serve as a test execution guide, and metadata 106 representing action invocations, expected graphical user interface (GUI) objects, expected results and errors, and the like, which is embedded in the documentation. Metadata 106 advantageously can be associated with an entire section of end-user visible documentation 104 to help drive an entire test case or set of test cases, and is not limited to each individual action or command.

Figure 2:
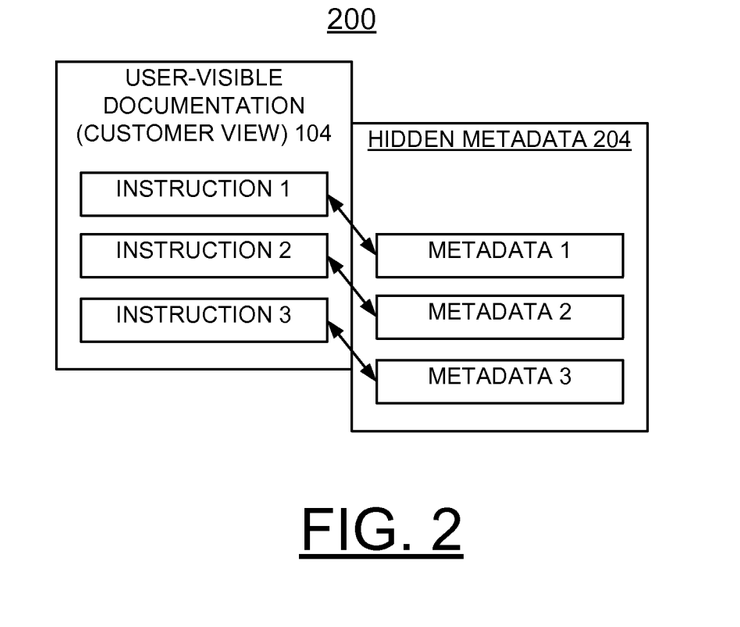
FIG. 2 is a detailed block diagram representation illustrating documentation of test system of FIG. 1 in accordance with the preferred embodiment.

Referring also to FIG. 2, there are shown documentation generally designated by the reference character 200 of the test system 100 of FIG. 1 in accordance with the preferred embodiment. Documentation 200 includes user visible documentation 104 written for end-users, providing a customer view, and hidden metadata 106 for the test engine 102. The metadata 106 is, for example, embedded into the documentation's mark-up language as a comment, or kept in the documentation's back-end database and associated with the instructions. However, it should be understood that the hidden metadata 106 optionally is associated with the documentation instructions using various other associative technology.

Test engine 102 implements features of an existing test engine including a functional testing block or functional test engine (FTE) 108. Test system 100 includes additional functional tester instructions and test cases 110, for example, used with the functional testing block 108 for an application 112. Formatted automated test instructions are run against the application 112 and results are returned to the test engine 102. Results report can be sent to interested parties and systems 114. The interested parties and systems 114 should be understood to include any person, application, machine, computer system and the like. Test system 102 includes the optional function 116 for automatically updating either or both documentation and the application For example, test engine 102 implement features, for example, of an existing JUnit test engine, taking each test case and turning it into an object (class), coded in Java. Each test case contains several methods, which can be overridden and customized for each test case. As shown in the following table 1, a list of the methods, such as, run, runTest, setUp, and tearDown together form an entire Test Case. Test Case writers update these methods or add more methods to automate their testing. The methods are coded to retrieve metadata from an outside location or to have metadata passed into the test case code as parameters, which tells the program exactly what it needs to do. Expected Test Results are included in a separate Test Result method, which is executed and determines whether the test failed or passed. Test engine 102 includes a framework, such as the Test Engine JUnit framework, to build and run our test cases.

TABLE 1

| | TestCase |
|---|---|
| TestResults | run(TestResults) |
| | runTest( ) |
| Collecting Parameters | setup( ) |
| | tearDown |

Figure 3:
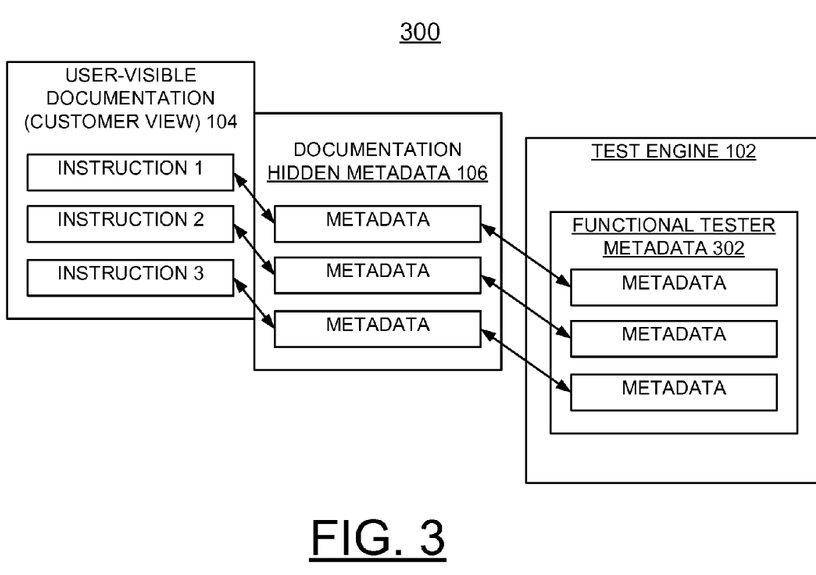
FIG. 3 is a detailed block diagram representation illustrating documentation and functional tester metadata connections of test system of FIG. 1 in accordance with the preferred embodiment.

Referring also to FIG. 3, there are shown documentation and functional tester metadata arrangement generally designated by the reference character 300 of the test system 100 of FIG. 1 in accordance with the preferred embodiment. The documentation and functional tester metadata arrangement 300 includes the user visible documentation 104 with the hidden metadata 106 that is mapped to functional tester metadata 302 inside the test engine 102. The hidden metadata 106 is mapped to functional tester metadata 302 using a relationship model, such as the Common Information Model. The relationship, for example, between the hidden metadata 106 and the functional tester metadata 302 is a many-to-many relationship. The functional tester metadata 302 is translated into automated test instructions by functional testing block 108 of the test engine 102.

In accordance with features of the invention, test engine 102 includes a mechanism for retrieving the documentation instructions and metadata from the user-visible documentation 104 and the documentation, hidden metadata 106. Retrieving the documentation instructions and metadata by test engine 102 advantageously is done by querying the documentation 104 and its hidden metadata 106, retrieving metadata and instruction pairs 1, 2, and storing the metadata and instruction pairs for use in the test engine as variables, in a database, or various other storage method. If the metadata is not stored as a runable instruction, a test engine database stores possible code instructions that are retrieved and matched with appropriate metadata when the code is translated into a runable test case. Test engine 102 includes code to translate the metadata into runable instructions. This translation code combines the metadata from the documentation and possible instructions to form an instruction that is executable against the application being testing. Then, these testing runable instructions are inserted into the appropriate place in the test engine framework using the documentation instruction order as a guide. With the example JUnit framework for test engine 102, the test case instructions are formed and placed in the runTest( ) method within a TestCase. The test engine 102 is able to run the instructions created and return whether the test case passed or failed.

In accordance with features of the invention, the hidden metadata 106 and functional tester metadata 302 can be implemented by various techniques; for example, the metadata can be implemented with code, with pictures, and with various other structures.

Figure 4:
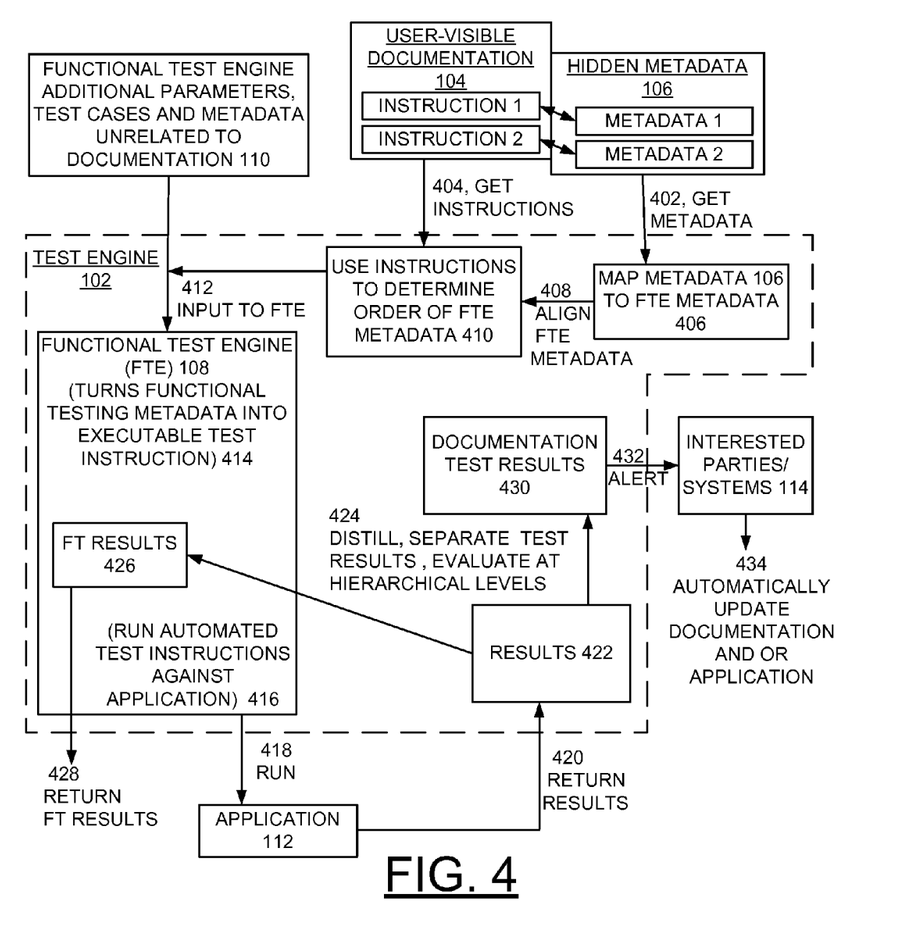
FIG. 4 is a logical flow diagram representation illustrating example operation of the test engine and test system of FIG. 1 in accordance with the preferred embodiment.

Referring also to FIG. 4, there are shown a logical flow diagram representation illustrating the test engine 102 and test system 100 of FIG. 1 in accordance with the preferred embodiment. The test engine 102 gets the embedded documentation metadata as indicated at a line 402, GET METADATA and the correlated documentation instructions as indicated at a line 404, GET INSTRUCTIONS. The documentation metadata 106 is mapped to the functional test engine metadata 302 as indicated at a block 406. For each single documentation instruction, the test engine 102 uses the instruction's associated metadata, which indicates important actions and expected results, to build an automated test instruction. The functional test engine metadata is aligned with appropriate documentation order as indicated at a line 408, ALIGN FTE METADATA.

The documentation instructions are used to determine the FTE metadata order as indicated at a block 410. The documentation determines the order in which to run each new automated test instruction, thus the documentation forms a series of test cases that are run against an application. Any functional test engine additional parameters, test cases and metadata unrelated to documentation at block 110 and the ordered FTE metadata is applied to the functional test engine (FTE) 108 order as indicated at a line 412, INPUT TO FTE. The functional test engine (FTE) 108 turns the functional testing metadata into executable test instructions as indicated at 414. The functional test engine (FTE) 108 runs automated test instructions against the application 112 as indicated at 416, and line 418, RUN.

As indicated at a line 420, RETURN RESULTS, results as indicated at a block 422 are returned. Test results fed back to the test engine 102 from the application 112 are compared against the expected results in metadata. Functional testing and documentation testing are performed at the same time, ensuring that both are accurate and that the documentation consistently reflects actual application functions. The results 422 are distilled, separated and evaluated at selected hierarchical levels as indicated at a line 424, DISTILL, SEPARATE TEST RESULTS, VALUATE AT HEIRARCHICAL LEVELS. The documentation and application are hierarchical, for example, functions are built using other functions and the documentation follow this model. The results evaluation can fail at different levels of the hierarchy, and with different error information captured at each level. This allows developers to see at exactly which level errors are cropping up, which helps them better understand where how interconnected code is really failing. Various kinds of testing from developers' documentation to customer documentation are provided. Also, with smart documentation tailored to multiple different levels of end-users, various kinds of documentation testing are provided to ensure accuracy at each level.

Functional test (FT) results as indicated at a block 426 are provided to the functional test engine (FTE) 108 and are returned as indicated at a line 428, RETURN FT RESULTS. The test engine 102 provides documentation test results as indicated at a block 430. Enhanced detailed error information advantageously is captured and sent along with results as indicated at a line 432, ALERT to the interested parties and systems 114. Once the results are returned, developers, customers, or other selected users are notified of the results via email, page or any other mechanism.

Once results are known, as indicated at a line 434 the documentation could be advantageously updated automatically, for example to reflect what the application actually does or that the application is out of synchronization.

Figure 5:
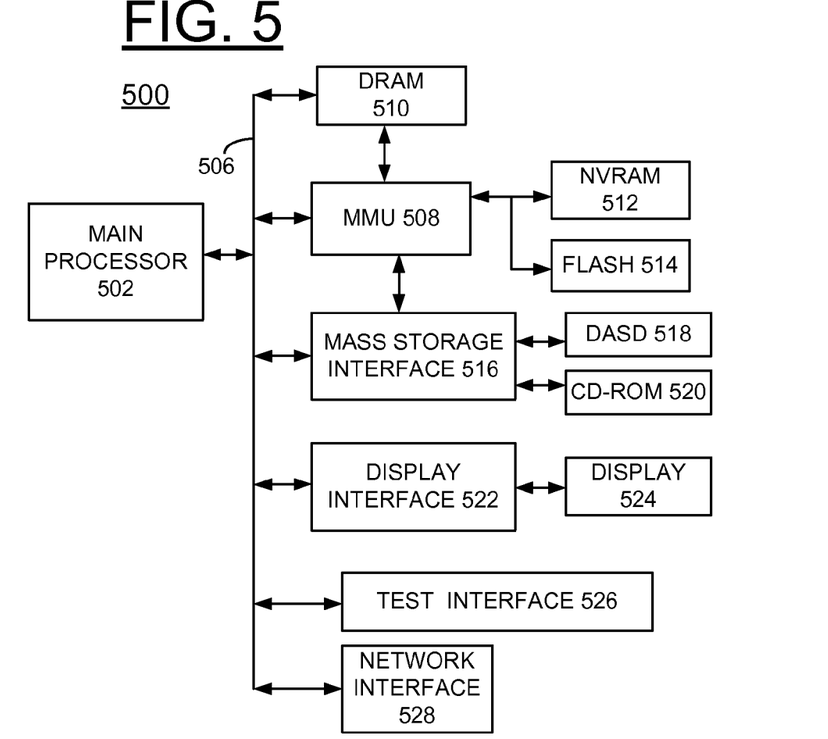
FIGS. 5 and 6 are block diagram representations illustrating a computer system and operating system for implementing integrated documentation and functional application testing in accordance with the preferred embodiment.
Figure 6:
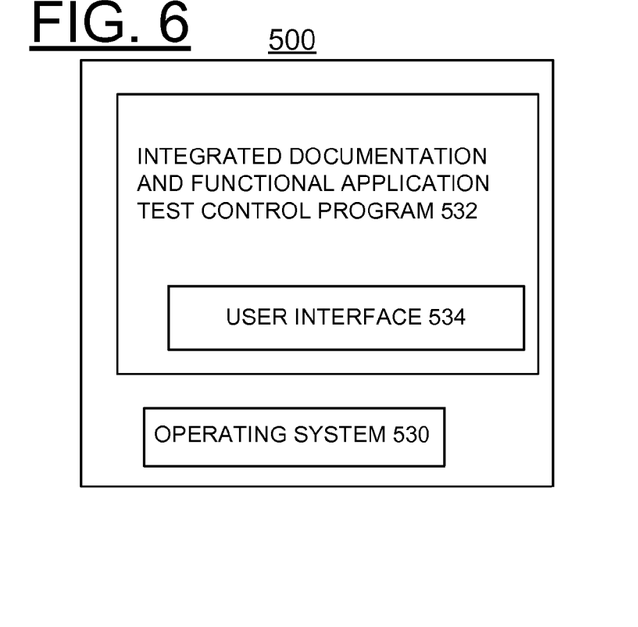

Referring to FIGS. 5 and 6, there is shown a computer test system for implementing integrated documentation and functional application testing generally designated by the reference character 500 in accordance with the preferred embodiment.

For example, the documentation for a Defect-tracking application might say this:
To submit a Defect:
1. Open a new Defect record
2. Fill in all required fields
3. Save the Defect record The underlying test engine would take in each documented instruction and its embedded metadata:
Instruction: Open a new Defect
Metadata: action=Open, record=Defect, result=Form Retrieved
Instruction: Fill in all required fields
Metadata: requiredfieldcharacteristic=red, tableOfFieldDefaults
Instructions: Save the Defect record
Metadata: action=Save, record=Defect, result=Defect committed For example, the documentation is parsed, pulling out key words that could be used to form automated test instructions, and automatically generating some of the metadata.

The test engine forms a list of automated test instructions based on the metadata and orders the instructions based on the documentation order. Note that this example is a generic pseudocode for explanation purposes only. Actual code would be tailored to call the specific application's APIs):
1. open(Defect);
2. findFields(red);
foreach redField{value=findValue(tableOfFieldDefaults); setFieldValue(value);}
3. save(Defect);

The test can now be run. Feedback is routed back to the test engine, where the actual results are compared to the expected results from metadata. In this way, functional and documentation testing is performed at the same time, ensuring that both are not only accurate, but that they are consistent.

Computer system 500 includes a main processor 502 or central processor unit (CPU) 502 coupled by a system bus 506 to a memory management unit (MMU) 508 and system memory including a dynamic random access memory (DRAM) 510, a nonvolatile random access memory (NVRAM) 512, and a flash memory 514. A mass storage interface 516 coupled to the system bus 506 and MMU 508 connects a direct access storage device (DASD) 518 and a CD-ROM drive 520 to the main processor 502.

Computer system 500 includes a display interface 522 connected to a display 524, and a test interface 526 coupled to the system bus 506, and a network interface 528 coupled to the system bus 506.

As shown in FIG. 6, computer system 500 includes an operating system 530, an integrated documentation and functional application test control program 532 of the preferred embodiment, and a user interface 534. Functional application test control program 532 defining the test engine 102 and test system 100 implements methods for integrated documentation and functional application testing in accordance with the invention.

Computer test system 500 is shown in simplified form sufficient for understanding the present invention. The illustrated computer test system 500 is not intended to imply architectural or functional limitations. The present invention can be used with various hardware implementations and systems and various other internal hardware devices, for example, multiple main processors.

Figure 7:
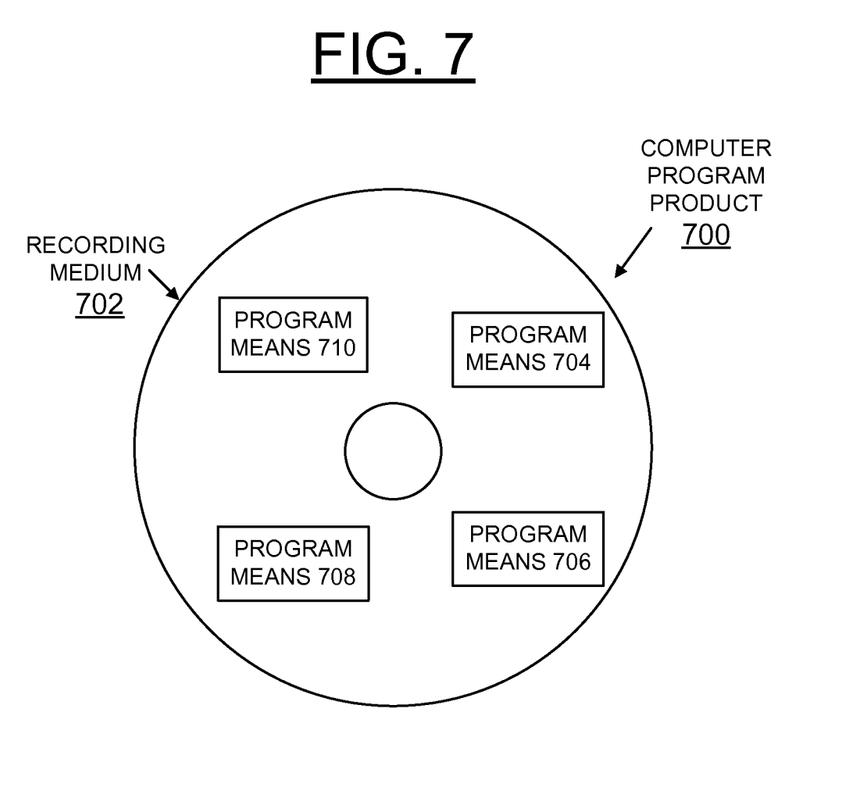
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, or another similar computer program product. Recording medium 702 stores program means 704, 706, 708, 710 on the medium 702 for carrying out the methods for implementing integrated documentation and functional application testing of the preferred embodiment in the system 500 of FIG. 5.

A sequence of program instructions or a logical assembly of one or more interrelated modules defined by the recorded program means 704, 706, 708, 710, direct the computer system 500 for implementing integrated documentation and functional application testing of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A computer-implemented method for implementing integrated documentation and functional application testing comprises:
    applying an integrated test engine to drive both functional application testing and documentation testing for an application;
    retrieving documentation instructions and documentation embedded metadata from documentation for the application;
    said documentation instructions and documentation embedded metadata representing how to automate each step in the documentation testing and expected results, mapping documentation embedded metadata to functional test engine metadata;
    using said documentation instructions to order functional test engine metadata;
    forming a list of automated test instructions based upon the functional test engine metadata and ordering the automated test instructions based upon documentation instruction order;
    wherein forming a list of automated test instructions based upon the functional test engine metadata includes translating the functional test engine metadata into a runable test instruction;
    and running a series of tests defined by the list of automated test instructions against the application to functionally test both the application and the documentation.

2. The computer-implemented method as recited in claim 1 wherein running the series of tests defined by the list of automated test instructions to functionally test both the application and the documentation includes testing consistency between the documentation and the application.

3. The computer-implemented method as recited in claim 1 wherein running the series of tests defined by the list of automated test instructions to functionally test both the application and the documentation includes automated documentation testing with each individual program fix being made.

4. The computer-implemented method as recited in claim 1 wherein running the series of tests defined by the list of automated test instructions to functionally test both the application and the documentation includes separating functional test results for the application and documentation test results for the documentation.

5. The computer-implemented method as recited in claim 1 wherein running the series of tests defined by the list of automated test instructions to functionally test both the application and the documentation includes evaluating test results at different levels of a hierarchy for the application and the documentation with different error information captured at each level.

6. The computer-implemented method as recited in claim 1 wherein running the series of tests defined by the list of automated test instructions to functionally test both the application and the documentation includes capturing detailed error information with test results.

7. The computer-implemented method as recited in claim 1 wherein running the series of tests defined by the list of automated test instructions to functionally test both the application and the documentation includes sending an alert to predefined interested parties and systems.

8. A computer program product embodied on a non-transitory computer readable storage medium for implementing integrated documentation and functional application testing, said non-transitory computer readable storage medium storing instructions, and said instructions when executed by the computer system cause the computer system to perform the steps comprising:
    providing an integrated test engine to drive both functional application testing and documentation testing for an application;
    retrieving documentation instructions and documentation embedded metadata from documentation for the application;
    said documentation instructions and documentation embedded metadata representing how to automate each step in the documentation testing and expected results, mapping documentation embedded metadata to functional test engine metadata;
    using said documentation instructions to order functional test engine metadata;
    forming a list of automated test instructions based upon the functional test engine metadata and ordering the automated test instructions based upon documentation instruction order;
    wherein forming a list of automated test instructions based upon the functional test engine metadata includes translating the functional test engine metadata into a runable test instruction;
    and running a series of tests defined by the list of automated test instructions against the application to functionally test both the application and the documentation.

9. The computer program product as recited in claim 8 wherein running the series of tests defined by the list of automated test instructions to functionally test both the application and the documentation includes testing consistency between the documentation and the application.

10. The computer program product as recited in claim 8 wherein running the series of tests defined by the list of automated test instructions to functionally test both the application and the documentation includes automated documentation testing with each individual program fix being made.

11. The computer program product as recited in claim 8 wherein running the series of tests defined by the list of automated test instructions to functionally test both the application and the documentation includes separating functional test results for the application and documentation test results for the documentation.

12. The computer program product as recited in claim 8 wherein running the series of tests defined by the list of automated test instructions to functionally test both the application and the documentation includes evaluating test results at different levels of a hierarchy for the application and the documentation with different error information captured at each level.

13. The computer program product as recited in claim 8 wherein running the series of tests defined by the list of automated test instructions to functionally test both the application and the documentation includes capturing detailed error information with test results.

14. The computer program product as recited in claim 8 wherein running the series of tests defined by the list of automated test instructions to functionally test both the application and the documentation includes sending an alert to predefined interested parties and systems.

15. An apparatus comprising a non-transitory computer readable storage medium embodying computer program code for implementing integrated documentation and functional application testing comprises:

an integrated test engine embodied on a non-transitory computer readable storage medium for driving both functional application testing and documentation testing for an application;

said integrated test engine retrieving documentation instructions and documentation embedded metadata from documentation for the application;

said documentation instructions and documentation embedded metadata representing how to automate each step in the documentation testing and expected results, said integrated test engine mapping documentation embedded metadata to functional test engine metadata;

said integrated test engine using said documentation instructions to order functional test engine metadata;

said integrated test engine forming a list of automated test instructions based upon the functional test engine metadata and ordering the automated test instructions based upon documentation instruction order;

wherein forming a list of automated test instructions based upon the functional test engine metadata includes translating the functional test engine metadata into a runable test instruction;

and said integrated test engine running a series of tests defined by the list of automated test instructions against the application to functionally test both the application and the documentation.

16. The apparatus for implementing integrated documentation and functional application testing as recited in claim 15 wherein said integrated test engine captures detailed error information with test results.

17. The apparatus for implementing integrated documentation and functional application testing as recited in claim 15 wherein said integrated test engine sends an alert to predefined interested parties and systems.

18. The apparatus for implementing integrated documentation and functional application testing as recited in claim 15 wherein said integrated test engine separates functional test results for the application and documentation test results for the documentation and evaluates test results.

* * * * *